US007856206B2

(12) United States Patent
Hyslop

(10) Patent No.: US 7,856,206 B2
(45) Date of Patent: Dec. 21, 2010

(54) SYSTEM AND METHOD FOR MANUALLY ADJUSTABLE DIRECTIONAL ANTENNA

(75) Inventor: Douglas A. Hyslop, Vienna, VA (US)

(73) Assignee: Nextel Communications Inc., Reston, VA (US)

( * ) Notice: Subject to any disclaimer, the term of this patent is extended or adjusted under 35 U.S.C. 154(b) by 1373 days.

(21) Appl. No.: 11/200,211

(22) Filed: Aug. 10, 2005

(65) Prior Publication Data

US 2006/0079304 A1 Apr. 13, 2006

Related U.S. Application Data

(60) Provisional application No. 60/608,109, filed on Sep. 9, 2004, provisional application No. 60/608,132, filed on Sep. 9, 2004, provisional application No. 60/608,123, filed on Sep. 9, 2004, provisional application No. 60/608,124, filed on Sep. 9, 2004, provisional application No. 60/608,133, filed on Sep. 9, 2004, provisional application No. 60/608,134, filed on Sep. 9, 2004, provisional application No. 60/608,135, filed on Sep. 9, 2004.

(51) Int. Cl.
*H04B 7/14* (2006.01)

(52) U.S. Cl. ......................................... 455/25; 343/714

(58) Field of Classification Search ................. 343/714, 343/703, 734, 760, 784, 880; 455/25
See application file for complete search history.

(56) References Cited

U.S. PATENT DOCUMENTS 5,300,935 A 4/1994 Yu
5,646,320 A 7/1997 Cassady et al.
6,057,765 A * 5/2000 Jones et al. .............. 340/572.2
6,111,542 A 8/2000 Day et al.
6,163,302 A * 12/2000 Bjorkengren et al. ....... 343/702
6,278,405 B1 8/2001 Ha et al.
6,400,315 B1 * 6/2002 Adler et al. ................. 342/359
6,486,832 B1 * 11/2002 Abramov et al. ...... 343/700 MS
6,490,439 B1 12/2002 Croft et al.
6,556,170 B2 4/2003 Northey
6,774,854 B2 * 8/2004 Wannagot et al. ..... 343/700 MS
6,816,121 B1 * 11/2004 Cheng et al. ................ 343/702
7,031,751 B2 * 4/2006 Hurler et al. ................ 455/557
2003/0185169 A1 10/2003 Higgins
2004/0090383 A1 5/2004 Wang et al.

(Continued)

FOREIGN PATENT DOCUMENTS

EP 0 936 747 A2 8/1999

OTHER PUBLICATIONS

International Search Report dated Mar. 8, 2006 (2 pages).

(Continued)

*Primary Examiner*—Tu X Nguyen

(57) ABSTRACT

Systems and methods for a manually adjustable directional antenna are disclosed. The device includes a housing and the housing includes a wireless modem, a directional antenna and an adjustment mechanism. The adjustment mechanism is coupled to the directional antenna via a mounting pipe. Alternatively, the housing includes a directional antenna, an adjustment mechanism, and a connector, which couples the directional antenna to an external modem. The adjustment mechanism may be an adjustment knob for the directional antenna within the housing or a rotatable turntable used to support and rotate the entire housing, including the directional antenna.

6 Claims, 4 Drawing Sheets

U.S. PATENT DOCUMENTS

| | | | | |
|---|---|---|---|---|
| 2004/0113861 | A1 | 6/2004 | Jackson et al. | |
| 2005/0116877 | A1 | 6/2005 | Wu | |
| 2005/0238088 | A1 | 10/2005 | Piepmeyer et al. | |
| 2005/0248495 | A1* | 11/2005 | Webb et al. | 343/757 |

OTHER PUBLICATIONS

Written Opinion of the International Searching Authority dated Mar. 8, 2006 (8 pages).

* cited by examiner

SYSTEM AND METHOD FOR MANUALLY ADJUSTABLE DIRECTIONAL ANTENNA

CROSS-REFERENCE TO RELATED APPLICATIONS

This application claims the benefit of U.S. Provisional Application Nos. 60/608,109, 60/608,132, 60/608,123, 60/608,124, 60/608,133, 60/608,134, and 60/608,135, all of which were filed Sep. 9, 2004, the entire disclosures of these applications are herein expressly incorporated by reference. This application is also related to U.S. application Ser. No. 11/200,210, entitled "System and Method for Automatically Adjustable Directional Antenna", filed on even date herewith.

FIELD OF THE INVENTION

This invention relates generally to wireless communication systems, and in particular, to broadband wireless devices and a method of using such devices in wireless communication systems.

BACKGROUND OF THE INVENTION

Wireless broadband data technologies are often coverage, or RSSI, limited on the reverse link and SNR, or interference, limited on the forward link. Coverage and interference are driving factors for the number of cell sites that a wireless network operator must build and the resulting performance provided at the edge of its cells. Wireless network operators desire to reduce the capital expenditures of the network build-out, while also maximizing performance, in terms of sector capacity and geographic availability of peak rates, within the site coverage footprint. Accordingly, wireless network operators seek to maximize both coverage and interference protection on both the forward and reverse links.

Two approaches are generally taken in maximizing coverage. One approach for portable/mobile end-user devices is to design a high-gain omni-directional antenna in the end-user device. This approach is limited by the size of the antenna that may be integrated with the portable/mobile end-user device, usually resulting in a gain around −1 dBi. A further limitation is the omni-directional nature of the antenna. Specifically, because the portable/mobile end-user device moves around, thus having no fixed orientation, and must be able to access base stations from any direction, the antenna must have equal gain in all directions. This approach detracts from providing a high gain for better coverage, and further does not reduce the interference seen from neighboring base stations.

A second approach, common in fixed communication systems, is to install a directional antenna at the customer premises and to arrange a cable extending back to the end-user device, typically a desk-mounted unit. This approach has the advantage of greater coverage given the higher-gain, directional antenna. This approach also provides better interference protection because the antenna may be directed towards the desired cell, and the antenna pattern reduces the interfering signal strengths. The disadvantage of this approach, however, is the installation of the directional antenna. Because the antenna must be accurately directed toward the base station, the wireless network operator may have to bear the cost of professionally installing antennas at the customer location. Alternatively, the wireless network operator can attempt to rely upon the end-user to mount and manually orient the antenna. However, the end-user may not be able to properly orient the directional antenna due to unfriendly mounting platforms and lack of technical experience. There is therefore needed systems and methods which address the above problems and maintain the benefits of a directional antenna approach while minimizing the costs and disadvantages associated therewith.

SUMMARY OF THE INVENTION

Systems and methods for an adjustable directional antenna are disclosed. The device includes an RF transparent housing. In accordance with a first embodiment of the present invention, the housing includes a wireless modem, a directional antenna and a manually operated adjustment mechanism, such as an adjustment knob or the like. The adjustment knob is coupled to the directional antenna via a mounting pipe. Accordingly, an end-user may manually adjust the direction of the directional antenna. The device can provide feedback to the end-user on the signal strength and quality as the end-user adjusts the directional antenna.

In accordance with a second embodiment of the present invention, the housing includes a directional antenna, a manually operated adjustment mechanism, such as an adjustment knob or the like, and a connector which couples the directional antenna to an external modem. The adjustment knob is coupled to the directional antenna via a mounting pipe. Accordingly, an end-user may manually adjust the direction of the directional antenna. A software program running on a computer coupled to the external modem can provide feedback to the end-user on the signal strength and quality as the end-user adjusts the directional antenna.

In accordance with a third embodiment of the present invention, the housing includes a directional antenna and a connector which couples the directional antenna to an external modem. A rotatable mechanism, such as a turntable or the like, supports the housing. Accordingly, an end-user may manually adjust the direction of the directional antenna by use of the rotatable mechanism. A software program running on a computer coupled to the external modem can provide feedback to the end-user on the signal strength and quality as the end-user adjusts the directional antenna.

In accordance with a fourth embodiment of the present invention, the housing includes a wireless modem and a directional antenna. A rotatable mechanism, such as a turntable or the like, supports the housing. Accordingly, an end-user may manually adjust the direction of the directional antenna by use of the rotatable mechanism. The device can provide feedback to the end-user on the signal strength and quality as the end-user adjusts the directional antenna.

In accordance with a fifth embodiment of the present invention, the housing includes a wireless modem coupled to a directional antenna via a mounting pipe and an internal connecting cable. The wireless modem includes a mechanical antenna adjuster, which automatically adjusts the direction of the directional antenna based on signal strength and quality.

In accordance with a sixth embodiment of the present invention, the housing includes a directional antenna and a mechanical antenna adjuster. The directional antenna is coupled to an external modem. The mechanical antenna adjuster is coupled to the external modem via a feedback control connection. The external modem uses the feedback control connection to direct the mechanical antenna adjuster to automatically adjust the direction of the directional antenna based on signal strength and quality.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
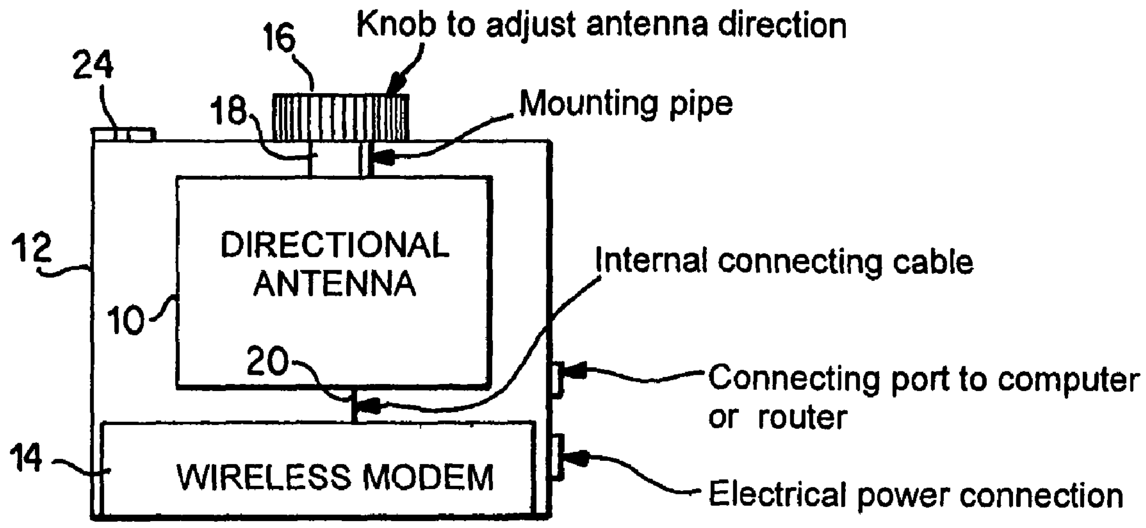
FIG. 1 illustrates an exemplary manually adjustable directional antenna system in accordance with the first embodiment of the present invention.

In the following, the same reference numbers will be used for the same components illustrated throughout the drawing figures.

The present invention incorporates a high-gain, directional antenna, into a housing along with a mechanism for adjusting, either manually or automatically, the orientation of the directional antenna. As described herein, an end-user device in accordance with the present invention may be a fixed or low portability broadband wireless device, such as a wireless modem utilized in various fixed/mobile broadband data systems, including the Flash OFDM system produced by Flarion Technologies Inc. The known end-user device used in the Flash OFDM system produced by Flarion Technologies Inc. is referred to as a PAD. The PAD includes a generally rectangular wireless modem coupled to an omnidirectional antenna, such as those commonly sold to consumers or small businesses for wireless Internet access. The end-user device or PAD is placed in a location having favorable RF conditions, and the connection to a computer or 802.11 router is made, typically, via an Ethernet cable. However, such PADs suffer the disadvantages discussed above.

In accordance with the first exemplary embodiment of the present invention, the end-user device is provided with a larger, RF-transparent, housing containing the wireless modem electronics, a directional planar antenna, and a mounting pipe for the antenna. The mounting pipe may be attached to the top of the housing. The mounting pipe is terminated in a user-adjustable mechanism to allow rotation of the directional antenna over a 360 degree range.

As illustrated in FIG. 1, the first embodiment of the present invention incorporates a manually adjustable directional antenna 10 within a housing 12 for a wireless device, such as a desktop modem 14 for broadband wireless data systems. The housing itself may be made of any RF transparent material, such as any of a number of RF transparent plastic materials or the like. The adjustment mechanism 16 may be, for example, a knob or the like, mounted on the top of the housing 12 (or other suitable location). The adjustment mechanism may be coupled directly to the mounting pipe 18 of the directional antenna 10. The mounting pipe/knob configuration arranged on/in the housing 12 incorporates a stop mechanism such that the antenna 10 may be rotated a full 360 degrees but, preferably, no farther, in order to reduce stress on the connectors and cable 20 within the housing 12.

The modem 14 itself may be mounted in the lower portion of the housing 12, and may be coupled to the antenna 10 through a cable 20 capable of withstanding the 360 degree rotation without degrading the quality of the connection between the modem and the antenna. Of course, any other suitable mounting of the components within the housing would be acceptable within the spirit of the invention.

The knob 16, connected to the antenna mounting pipe 18, may be adjusted over 360 degrees and may include stops such that any point within the 360 degree rotation will be held if selected by the user.

Status indicators 24, such as lights, bars, numerical displays or the like, may be provided on an exterior of the housing 12 to provide feedback to the end-user on the signal strength and quality as the end-user changes the antenna direction. The status indicators reflect the signal measurements made by the wireless modem 14, and aid the user in finding the optimal antenna orientation. The means by which the signal measurements are made and indicated to the user are known generally and will not be described further herein.

Figure 7:
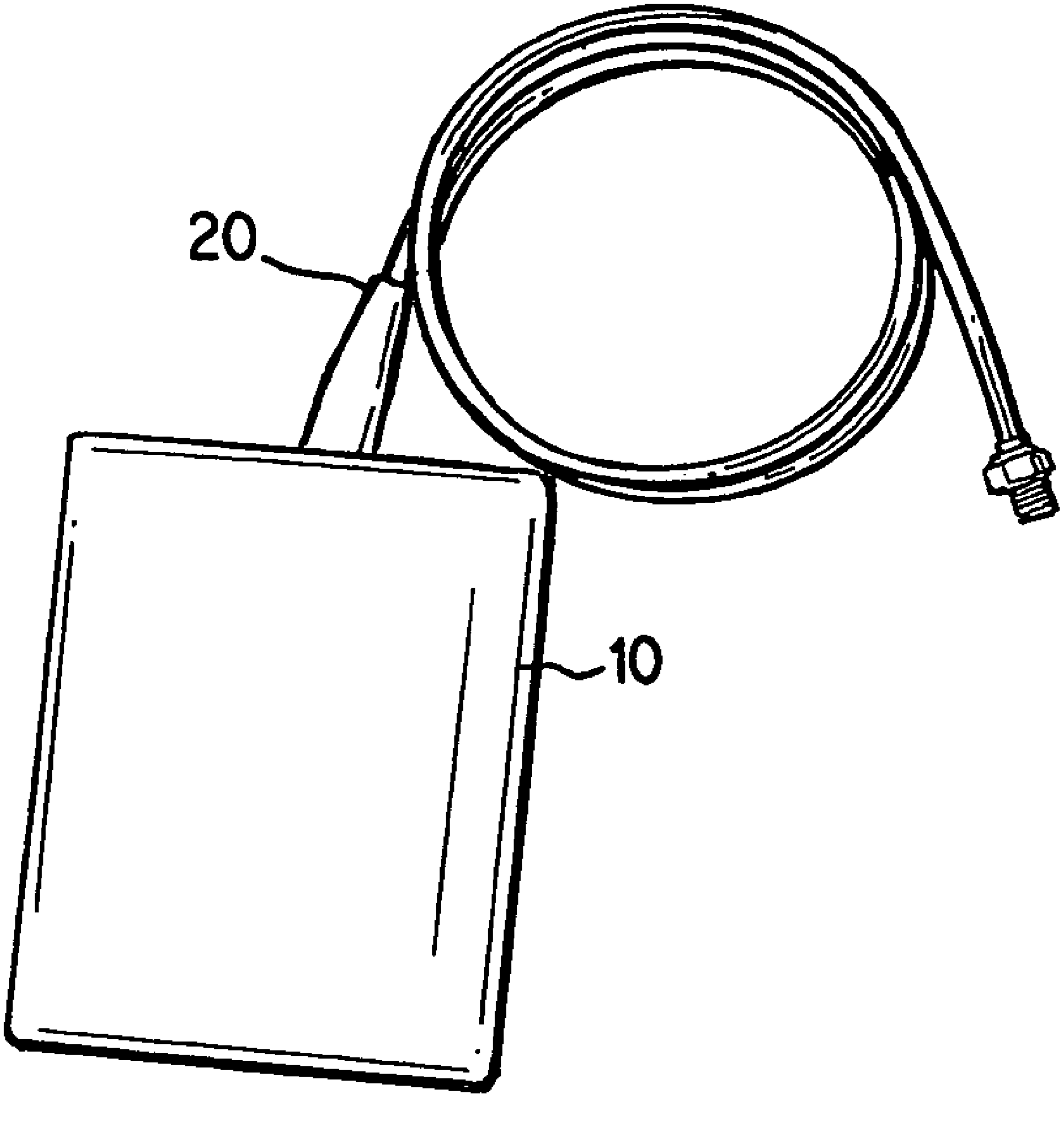
FIG. 7 illustrates an exemplary directional antenna which may be incorporated into the adjustable directional antenna systems of FIGS. 1-6.

The directional antenna 10 may be of various portable types. For example, directional antennas produced by Centurion and Tecom may be incorporated into the invention. Such directional antennas provide higher gain than omni-directional antennas, while still having a sufficient form factor such that the overall size of the wireless device would be acceptable to a user. FIG. 7 illustrates the Centurion "Whisper" directional antenna, having a +7.5 dBi gain, which may be used in the present invention. Of course, other directional antennas, having different form factors and characteristics, may also be incorporated into the wireless device according to the present invention.

In accordance with the second embodiment of the present invention, an RF-transparent housing contains the directional planar antenna and a mounting pipe for the antenna. The mounting pipe may be attached to the top of the housing and may be terminated in a user-adjustable knob to allow rotation of the directional antenna over a 360 degree range.

Figure 2:
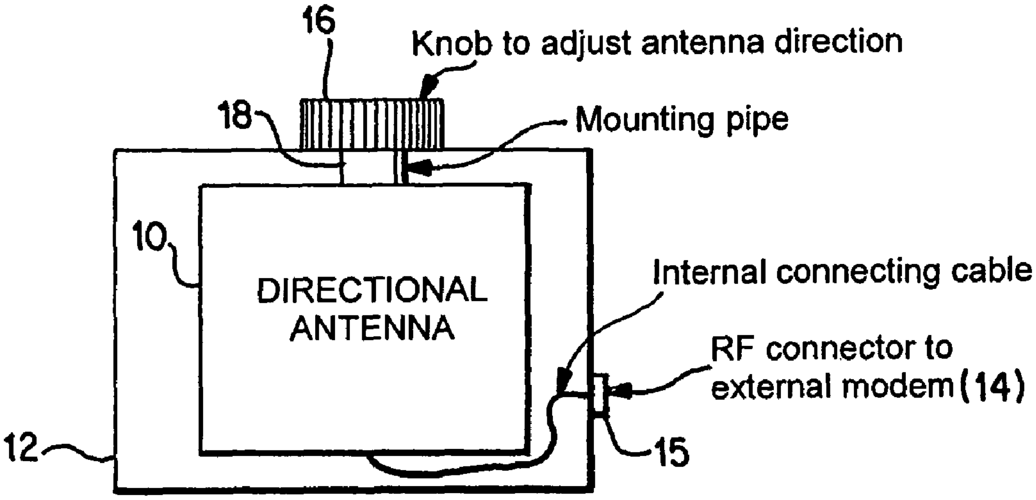
FIG. 2 illustrates an exemplary manually adjustable directional antenna system in accordance with the second embodiment of the present invention.

As illustrated in FIG. 2, the second embodiment of the present invention manually adjusts the orientation of a directional antenna 10 within an RF-transparent housing 12 for use with an external broadband wireless device 14, such as a standalone modem or a PCMCIA card (not shown). The device is provided with an RF connector 15 to couple the antenna with the external device. The adjustment mechanism may be a knob 16 mounted on the top of the housing, connected directly to the mounting pipe 18 of the directional antenna 10. As with FIG. 1, within the housing 12, the mounting pipe/knob may contain a stop mechanism such that the antenna may be rotated a full 360 degrees, but preferably no farther, in order to reduce stress on the connectors and cable within the housing.

The knob 16, connected to the antenna mounting pipe 18, may be adjusted over 360 degrees, and may include stops such that any point within the 360 degree rotation will be held if selected by the user.

A software program running on an end-user's computer (not shown) may provide signal strength and quality information to the end-user, and be used in finding the optimal antenna orientation. Such programs are conventionally known and need not be described in any greater detail here. The software program display reflects the signal measurements made by the wireless modem, and aids the end-user in finding the optimal antenna orientation.

Figure 3:
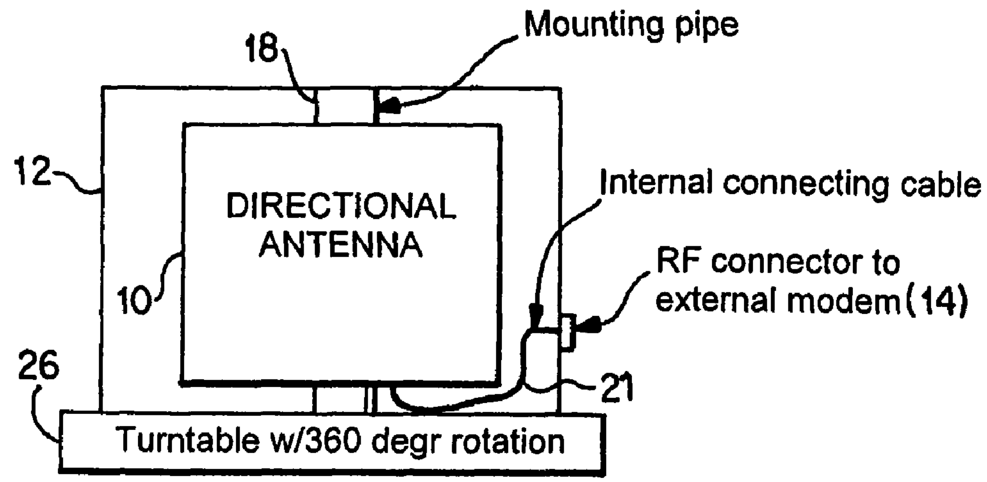
FIG. 3 illustrates an exemplary manually adjustable directional antenna system in accordance with the third embodiment of the present invention.

In accordance with the third embodiment of the present invention shown in FIG. 3, an RF-transparent housing 12 contains the directional planar antenna 10 and a mounting pipe 18 for the antenna. The housing is mounted on a rotatable mechanism 26, such as a turntable. The turntable 26 allows rotation of the directional antenna 10 over a 360 degree range. Incorporation of the directional antenna 10 within the housing 12 protects the antenna and connecting cable 21 in a form that is readily integrated with existing devices.

As illustrated in FIG. 3, the third embodiment of the present invention manually adjusts the orientation of the directional antenna 10 within the RF-transparent housing 12 for use with an external broadband wireless device 14 such as a standalone modem or a PCMCIA card (not shown). The adjustment mechanism 26 may be a turntable or the like which supports the housing and antenna assembly. The turntable 26 may be adjusted over 360 degrees, and preferably contains stops such that any point within the 360 degree rotation will be held if selected by the end-user.

As with the embodiment of FIG. 2, a software program running on the end-user's computer may provide signal strength and quality information to the end-user, and may be used in finding the optimal antenna orientation. The software program display reflects the signal measurements made by the wireless modem, and aids the end-user in finding the optimal antenna orientation.

In accordance with the fourth exemplary embodiment of the present invention, a larger, RF-transparent housing contains the wireless modem electronics, a directional planar antenna, and a mounting pipe for the antenna attached to the modem body. The entire modem/antenna assembly and housing is mounted on a rotatable mechanism, such as turntable or the like, allowing rotation of the directional antenna over a 360 degree range. The present invention adjusts the antenna orientation by turning the entire device housing, thus reducing tension on the internal RF connectors and cables.

Figure 4:
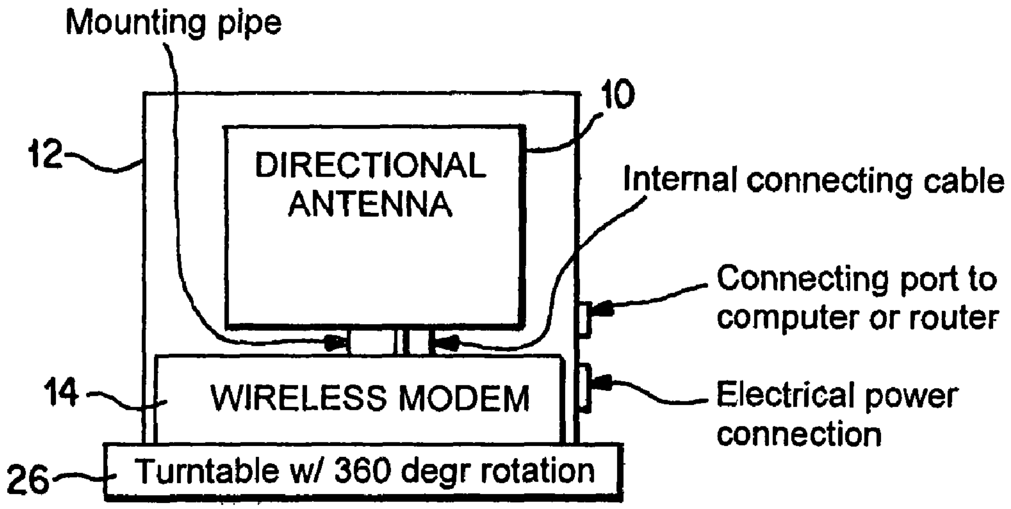
FIG. 4 illustrates an exemplary manually adjustable directional antenna system in accordance with the fourth embodiment of the present invention.

As illustrated in FIG. 4, the fourth exemplary embodiment incorporates a manually adjustable directional antenna 10 within a housing 12 for a wireless device 14, such as a desktop modem for broadband wireless data systems. The adjustment mechanism 26 may be a turntable or the like supporting the entire housing 12 assembly containing the modem 14 and antenna 10. The turntable preferably contains stops, or utilizes sufficiently provided friction, such that the antenna may be rotated a full 360 degrees and such that any point within the 360 degree rotation will be held if selected by the user.

Status indicators, such as status lights or the like, on the exterior of the housing provide feedback to the user on the signal strength and quality as the user changes the antenna direction. The status lights reflect the signal measurements made by the wireless modem, and aid the user in finding the optimal antenna orientation.

In accordance with the fifth exemplary embodiment of the present invention, the end-user device utilizes a larger, RF-transparent, housing containing the wireless modem electronics, a directional planar antenna, and a mounting pipe for the antenna attached to a mechanical device integrated with the modem that is capable of rotating the directional antenna over a 360 degree range.

Figure 5:
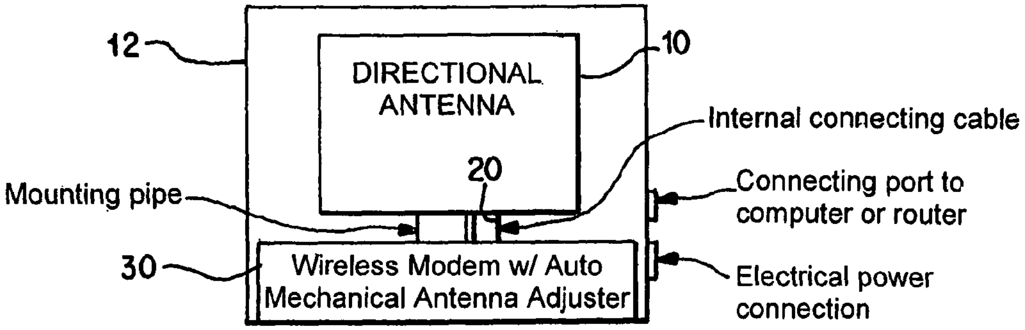
FIG. 5 illustrates an exemplary automatically adjustable directional antenna system in accordance with the fifth embodiment of the present invention.

As illustrated in FIG. 5, the fifth exemplary embodiment of the present invention incorporates a directional antenna 10 within a housing 12 for a wireless device, such as a desktop modem for broadband wireless data systems. The directional antenna 10 is attached to a mechanism 30 capable of rotating the antenna over a 360 degree range. The modem processor (not illustrated) controls the antenna rotation mechanism. Upon modem power-up or upon change of antenna signal quality from its long-term average, the modem directs the mechanical device 30 to rotate the antenna through the 360-degree range. The modem receiver (not illustrated) monitors signal strength and quality as a function of antenna orientation, and at the end of the 360-degree search, re-orients the antenna 10 to the optimal direction for signal strength and quality.

The modem itself may be mounted in the lower portion of the housing, and is connected to the antenna 10 through a cable 20 capable of withstanding the 360 degree rotation without degrading the quality of the connection between the modem and the antenna. As shown in FIG. 5, the modem is integrated together with the mechanical adjuster 30, although it need not be.

The sixth exemplary embodiment of the present invention includes an RF-transparent housing containing the directional planar antenna and a mounting pipe for the antenna attached to a mechanical device. The mechanical device is capable of rotating the directional antenna over a 360 degree range. An external modem or PC card processor controls the mechanical device.

Figure 6:
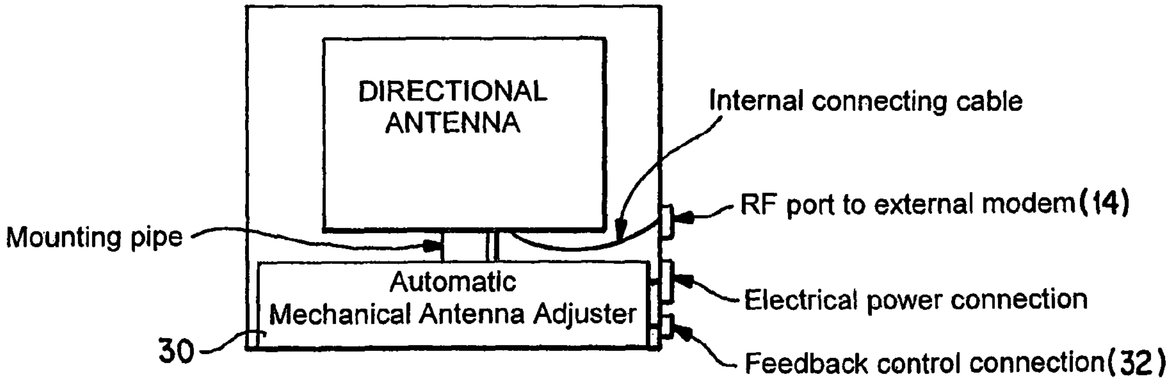
FIG. 6 illustrates an exemplary automatically adjustable directional antenna system in accordance with the sixth embodiment of the present invention.

As illustrated in FIG. 6, the sixth exemplary embodiment of the present invention incorporates a directional antenna 10 within an RF-transparent housing 12 for use with an external broadband wireless device 14, such as a standalone modem or a PCMCIA card (not shown). The directional antenna 10 is attached to a mechanism 30 capable of rotating the antenna over a 360 degree range. The external modem provides a feedback mechanism 32 to aid in controlling the antenna rotation mechanism 30. Upon modem power-up or upon change of antenna signal quality from its long-term average, the modem directs the mechanical device 30 to rotate the antenna through the 360-degree range. The modem receiver monitors signal strength and quality as a function of antenna orientation, and at the end of the 360-degree search, re-orients the antenna to the optimal direction for signal strength and quality.

The modem itself, in FIG. 6, is arranged external to the housing, and is coupled to the housing through two connections, one being the RF cable to the antenna port of the device, and the second being the cable for the feedback control mechanism.

The automated approach to optimizing the antenna orientation has several benefits, such as minimal end-user interaction and automatic re-optimization upon change in device location or upon installation of new base stations. Moreover, the additional cost of this type of antenna may be acceptable since it is to be targeted for end-users located in worse RF conditions. Because the present invention is an external add-on, only end-users who are so-called "coverage-challenged" need to incur the higher cost of this approach.

Exemplary embodiments of the present invention employ directional planar antennas with gain of 7 to 8 dBi and front-to-back ratios of 20 dB or more. The antenna size can be approximately 4 inches×4 inches, which is a reasonable dimension for a desk-mounted or low portability device. The performance provided by the present invention dramatically improves the link budget in a wireless network, and also greatly improves performance through attenuation of interference from neighboring cells. This significantly reduces capital expenditures for the wireless network operator and reduces installation cost considering the level of performance gain. The user interface is much simpler than traditional, externally mounted directional antennas, thus improving acceptance and "uptake" by subscribers.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

What is claimed is:

1. A broadband wireless device, comprising:

an RF transparent housing, the housing comprising a wireless modem;

a directional antenna coupled to the wireless modem;

a manual adjustment mechanism; and a mounting pipe coupling the directional antenna and the adjustment mechanism, wherein the adjustment mechanism adjusts the position of the directional antenna and the RF transparent housing about 360 degrees of rotation, and wherein the device provides feedback on signal strength and quality as the directional antenna is adjusted, wherein the manual adjustment mechanism is a turntable arranged outside of, and below the RF transparent housing, the turntable supporting the RF transparent housing, and the turntable including stops to hold the position of the directional antenna at a particular position within the 360 degree rotation.

2. The broadband wireless device of claim 1, further comprising a status indicator arranged so as to be viewable by a user externally of the housing, the status indicator providing the feedback on signal strength and quality as the directional antenna is adjusted.

3. A broadband wireless device, comprising:

an RF transparent housing, the housing comprising a directional antenna;

a connector to an external modem, wherein the connector couples the directional antenna to an external modem;

a manual adjustment mechanism; and a mounting pipe coupling the directional antenna and the adjustment mechanism, wherein the adjustment mechanism adjusts the position of the directional antenna and the RF transparent housing about 360 degrees of rotation, and wherein a software program running on a computer coupled to the external modem provides feedback on signal strength and quality as the directional antenna is adjusted, wherein the manual adjustment mechanism is a turntable arranged outside of, and below the RF transparent housing, the turntable supporting the RF transparent housing, and the turntable including stops to hold the position of the directional antenna at a particular position within the 360 degree rotation.

4. The broadband wireless device of claim 3, further comprising a status indicator arranged so as to be viewable by a user externally of the housing, the status indicator providing the feedback on signal strength and quality as the directional antenna is adjusted.

5. The broadband wireless device of claim 3, further comprising a display coupled with the computer to provide the feedback on signal strength and quality as the directional antenna is adjusted.

6. A method of orienting a broadband wireless device, the method comprising the acts of:

incorporating a directional antenna into an RF transparent housing of a portable broadband wireless device;

coupling a turntable to the directional antenna and the RF transparent housing, wherein the turntable rotates the directional antenna and RF transparent housing about 360 degrees of rotation, the turntable is arranged outside of, and below the RF transparent housing, the turntable supporting the RF transparent housing, and the turntable including stops to hold the position of the directional antenna at a particular position within the 360 degree rotation;

adjusting the orientation of the directional antenna via the mechanism based on feedback concerning signal strength and quality provided as the directional antenna is rotated, wherein the mechanism is a manual adjustment mechanism coupled so as to rotate the directional antenna within the RF transparent housing.

* * * * *